United States Patent Office 3,493,639
Patented Feb. 3, 1970

3,493,639
PROCESS FOR PRODUCING PENTAVALENT PHOSPHORUS DERIVATIVES
Peter Tavs, Hennef, Germany, assignor to Shell Oil Company, New York, N.Y., a corporation of Delaware
No Drawing. Filed Aug. 30, 1966, Ser. No. 575,952
Claims priority, application Germany, Oct. 27, 1965, S 100,235; Apr. 18, 1966, S 103,235
Int. Cl. C07f 9/32, 9/40, 9/50
U.S. Cl. 260—969         15 Claims

ABSTRACT OF THE DISCLOSURE

Process of producing an organo pentavalent phosphorus compound by reacting (a) an aromatic or vinyl halide with (b) a trivalent phosphorus compound of at least one alkoxy substituent on the phosphorus atom, in the presence of a nickel halide catalyst, while continuously removing from the resulting mixture the alkyl halide by-product of the reaction.

---

This invention relates to an improved process for the production of certain organo pentavalent phosphorus compounds.

PRIOR ART

General methods are available in the art for the production of pentavalent phosphorus organo compounds wherein each carbon atom to which the phosphorus is directly bonded is a portion of an aliphatic moiety and is not a member of an unsaturated linkage. For example, alkyl halides react with trialkyl phosphites to produce dialkyl phosphonic acid esters in a general type of process frequently referred to as the Arbuso Reaction. Such processes have not been available for reaction of aromatic or vinyl halides with phosphites or similar trivalent phosphorus compounds and as a result, esters of aromatic or vinyl phosphonic acids have been prepared only in multistep operations, e.g., reaction of an aromatic hydrocarbon with halophosphines followed by hydrolysis and esterification.

THE OBJECTS

It is an object of the present invention to provide an improved method of producing certain pentavalent phosphorus compounds wherein the phosphorus is directly bonded to an atom which is a member of an aromatic ring or an ethylenic linkage. More particularly, it is an object of the present invention to provide an improved process of reacting aromatic or vinyl halides with trivalent phosphorus compounds of at least one alkoxy substituent on the phosphorus atom to produce analogous pentavalent phosphorus compounds having as a phosphorus substituent the aromatic or vinyl moiety of the halide reactant.

THE INVENTION

It has now been found that these objects are accomplished by contacting (a) an aromatic or vinyl halide with (b) a trivalent phosphorus compound of at least one alkoxy substituent on the phosphorus atom, in the presence of a nickel halide catalyst under conditions whereby the alkyl halide by-product of the contacting is continuously removed from the reaction mixture. The process results in the formation of a pentavalent phosphorus product characterized by a phosphorus-oxygen multiple bond and by a direct bond between the phosphorus and the aromatic or vinyl moiety of the halide reactant.

THE HALIDE REACTANT

The aromatic or vinyl halide reactant of the invention is a reactant of up to 20 carbon atoms and is represented by the formula $$R(X)_m \qquad (I)$$

wherein X is halogen, $m$ is a whole number from 1 to 2 inclusive and R represents an organic radical characterized in that the carbon atom to which each X moiety is attached is a member of an aromatic ring or is a member of an ethylenic linkage, i.e., a member of a carbon-carbon double bond. The R group is hydrocarbon, that is, contains only atoms of carbon and hydrogen, or is substituted-hydrocarbon wherein the non-hydrocarbon substituent(s) is (are) non-reactive. It is well known that non-vinylic aliphatic halides are more reactive than halides of either the aromatic or vinyl types, and as a result it is required that the R moiety be free from halogen substituents attached to non-vinylic aliphatic carbon atoms, i.e., be free from such aliphatic halide groups. The R moiety suitably contains from 2 to 20 carbon atoms, preferably 2 to 10, and when substituted-hydrocarbyl contains from 1 to 3 non-reactive substituents such as alkoxy, aryloxy, hydroxy, carboxy, carbalkoxy, nitro, amino, mono- to dialkylamino, mercapto, alkylmercapto or acyl.

In the above Formula I the X term independently represents halogen and halide reactants wherein the halogen(s) is (are) fluorine, chlorine, bromine or iodine is (are) at least in part operable. Preferred as the X term however are the halogens of atomic number from 17 to 35 inclusive, i.e., the middle halogens chlorine and bromine.

The halide reactant preferably contains from 1 to 2 aromatic rings and/or 1 to 2 ethylenic linkages as the only carbon-carbon unsaturation present. Illustrative of suitable halide reactants are the hydrocarbon vinyl halides such as vinyl chloride, 1-chloropropene,
1-bromopropene,
2-chlorobutene-2,
1-bromododecene,
1,8-dichloro-1,7-octadiene,
1-chloro-6-bromo-1,5-hexadiene,
1-bromocyclohexene,
1,2-dichloroethylene,
α-chlorostyrene,
β-bromostyrene
  and 1,2-dibromoethylene;

the hydrocarbon aromatic halides including chlorobenzene,
bromobenzene,
p-bromochlorobenzene,
o-dichlorobenzene,
m-chlorotoluene,
p-chlorostyrene,
α-chloronaphthalene,
β-bromonaphthylene,
4,4'-dibromobiphenyl,
2,2-bis(4-chlorophenyl)propane,
p-tert-butylchlorobenzene,
1-chloro-2,4,6-trimethylbenzene,
1-bromo-3,5-dihexylbenzene
  and p-tetradecylchlorobenzene;

substituted-hydrocarbon vinyl halides such as 4-acetoxy-1-chlorobutene, 3-ethoxy-1-chloropropene, 6-bromohept-5-en-2-one, and 2-(p-nitrophenyl)-1-bromoethylene; and substituted-hydrocarbon aromatic halides including p-carbethoxychlorobenzene, m-bromophenyl, p-chloroaniline, 2,4-dibromobenzoic acid, m-nitrobromobenzene, o-bromo-N,N-dimethylaniline, 3-bromo-4-chlorothiophenol and m-ethylmercaptochlorobenzene.

Also suitable are heterocyclic halide reactants which may be considered to be either of the aromatic or vinyl type, e.g., 2-chlorothiophene, 3-bromothiophene, 2-chloropyridine, 3,5-dibromopyridine and 3-chlorofuran.

Largely because of the desirability of the products derived therefrom, aromatic halide reactants are preferred over analogous reactants of the vinyl type and particularly preferred are mononuclear carbocyclic aromatic halides which are hydrocarbyl halides or substituted-hydrocarbyl halides wherein the non-hydrocarbyl substituents are hydroxy, amino, mono- to dialkylamino, alkanoyl or carbalkoxy.

THE TRIVALENT PHOSPHORUS REACTANT

The process of the invention comprises the reaction of the aromatic or vinyl halide reactant as defined hereinabove with a trivalent phosphorus derivative having at least one alkoxy group as a phosphorus substituent. One class of such trivalent phosphorus derivatives is represented by the formula

wherein R' is lower alkyl of up to 7 carbon atoms, with the proviso that two R's may together form a divalent alkylene moiety of from 2 to 7 carbon atoms, R" is R or R' wherein R and R' have the previously stated significance, $a$ is a whole number from 1 to 3 inclusive and $b$ is a whole number from 0 to 2 inclusive selected so that the sum of $a$ and $b$, i.e., the term $(a+b)$ is equal to 3.

In the above Formula II when $a$ is 1, that is, the phosphorus has a single alkoxy substituent, the trivalent phosphorus reactant is an alkyl phosphinite as illustrated by methyl diethylphosphinite, ethyl dioctylphosphinite, butyl diphenylphosphinite, hexyl phenyloctylphosphinite, 1-propoxyphospholidine, 1-methoxyphospholidine, amyl dimethylphosphite and propyl bis(p-ethoxyphenyl)phosphinite.

When the term "$a$" in the above Formula II is 2, the trivalent phosphorus reactant is a dialkyl phosphonite as exemplified by diethyl benzenephosphonite diisopropyl ethanephosphonite, dihexyl p- aminobenzenephosphonite, dimethyl butanephosphonite, dibutyl heptanephosphonite and dimethyl benzenephosphonite.

When each phosphorus substituent of the trivalent phosphorus reactant is alkoxy, the reactants are trialkyl phosphites as illustrated by trimethylphosphite, triethylphosphite, triisopropyl phosphite, methyl diethyl phosphite, tributyl phosphite, ethyl propyl hexyl phosphite, trihexyl-phosphite and 1 - ethoxy - 1,3,2 - dioxaphosphorinane and 1 - methoxy - 1,3,2 - dioxaphospholidine. The class of trialkyl phosphites, particularly acyclic trialkyl phosphites, comprises a preferred class of trivalent phosphorus reactants.

The trivalent phosphorus reactant is typically employed in molar amounts equal to or in excess over the amount of halide reactant. The optimum ratio of reactants will in part depend upon the functionality of the halide reactant, i.e., whether the halide reactant has one or two halogen substituents, and it should be appreciated that when the halide reactant is a reactant of two halogen substituents it is possible to effect reaction of one or alternatively of both halide moieties, particularly when the halogen substituents are not the same. Suitable molar ratios of trivalent phosphorus reactant to halide reactant of from about 1:1 to about 10:1 are satisfactory although molar ratios of trivalent phosphorus reactant to halide substituent of the halide reactant of from about 1:1 to about 3:1 are preferred.

THE CATALYST

The catalyst employed is a nickel halide, that is, a halide salt of a divalent nickel cation. Although nickel halides such as nickel fluoride and nickel iodide are in part operable, best results are obtained when the nickel halide catalyst is nickel chloride or nickel bromide, particularly nickel chloride.

The amount of nickel halide catalyst to be employed is not critical and satisfactory results are obtained when amounts of catalyst from about 0.1% mole to about 20% mole based on the halide reactant are employed. Preferred, however, are amounts of catalyst from about 2% mole to about 10% mole on the same basis.

THE PROCESS CONDITIONS

The process is conducted by contacting the reactants and catalyst at an elevated temperature. Temperatures from about 100° C. to about 225° C. are satisfactory. When the more reactive aromatic or vinyl bromides are employed a preferred reaction temperature range is from about 130° C. to about 170° C. The less active aromatic or vinyl chlorides are preferably reacted at a somewhat higher temperature, e.g., from about 150° C. to about 200° C.

The reaction is conducted under conditions whereby the reactants are maintained in the liquid phase. Although on some occasions it may be useful to employ an inert reaction diluent, e.g., an aromatic hydrocarbon, in most applications the presence of a diluent is not required and is preferably avoided. The reaction pressure is not critical so long as the reactants are maintained substantially in the liquid phase. Suitable pressures are atmospheric or superatmospheric, e.g., from about 1 atmosphere to about 50 atmospheres.

To obtain optimum results, the reaction is preferably conducted under substantially anhydrous conditions in an inert reaction environment and the presence in the reaction mixture of reactive materials such as water, oxygen and the like is preferably avoided. If desired, a small proportion of a conventional antioxidant, e.g., up to about 2% wt. of hydroquinone, 2,6 - ditert - butyl-4-methylphenol, bis(3,5 - di - tert - butyl-4-hydroxyphenyl)methane or the like, may be included within the reaction mixture to counteract the effect of any oxygen inadvertently introduced into the reaction mixture, but for most applications the addition of antioxidant is not of any substantial benefit.

The reaction is conducted by contacting the halide reactant and the trivalent phosphorus reactant in the presence of the catalyst. Although other reaction procedures are operable, in order to obtain maximum yields of product and to minimize undesirable side reactions, it is preferred to add one reactant, e.g., the trivalent phosphorus compound, gradually or in increments to a mixture of the other reactant and at least a portion of the catalyst while removing product alkyl halide from the reaction mixture. In this manner, prolonged contact between alkyl halide product and unreacted trivalent phosphorus reactant is avoided. A variety of methods of alkyl halide removal are suitable, e.g., removal through selective extraction or stable complex formation, but the preferred methods comprise removal of alkyl halide product in the vapor phase as by distilling alkyl halide from the reaction mixture at a rate substantially equivalent to the rate of addition of the trivalent phosphorus reactant. Subsequent to reaction, the product mixture is separated and the product recovered by conventional methods, e.g., as by fractional distillation, filtration, selective extraction, fractional crystallization and the like.

THE PRODUCT

The product of the invention is a pentavalent phosphorus compound characterized by a phosphorus-oxygen double bond, by one less alkoxy phosphorus substituent than the trivalent phosphorus reactant and by the presence as a phosphorus substituent of the organic moiety of the aromatic or vinyl halide reactant. In terms of the preferred reactants as above defined, the product is represented by the formula

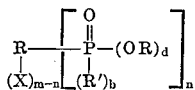

wherein R, R′, R″, m and b have the previously stated significance, n is a whole number from 1 to 2 selected so that $m+n=2$, and d is a whole number from 0 to 2 inclusive selected so that $b+d=2$.

Illustrative of such products are dialkyl phosphonic acid esters produced from trialkyl phosphites, e.g., diethyl phenylphosphonate, diethyl p-tolylphosphonate, dimethyl p - dodecylphenylphosphonate, diethyl α-styrylphosphonic acid and dipropyl vinylphosphonate; alkyl phosphinic acid esters prepared from dialkyl phosphonites, such as ethyl phenyl (p-methoxyphenyl)phosphinate, ethyl diphenylphosphinate and propyl di(α-naphthyl)phosphinate; and tertiary phosphine oxides prepared from alkyl phosphinites, e.g., triphenylphosphine oxide, diphenyl(p-dodecylphenyl)phosphine oxide and vinyldiethylphosphine oxide.

The pentavalent phosphorus compounds are useful as agricultural chemicals, particularly as insecticides, as oxidation-inhibiting additives for mineral lubricating oils, and as selective extraction solvents as for selectively separating aromatics from paraffins, e.g., benzene from a $C_6$ paraffin fraction of similar boiling point. The vinyl pentavalent phosphorus derivatives are particularly useful as monomers to be incorporated into polyolefins such as polyethylene or polypropylene in order to provide flame resistance to the resulting polymer compositions.

To further illustrate the improved process of the invention, the following examples are provided. It should be understood that the details thereof are not to be regarded as limitations as they may be varied as will be understood by one skilled in this art.

Example I

To a reactor was charged 157 g. of bromobenzene and 6.5 g. of anhydrous nickel chloride and the resulting mixture was heated to 150° C. To this mixture was added dropwise 199 g. of triethyl phosphite while the mixture was stirred. The phosphite addition was controlled so that the ethyl bromide formed was continuously removed with the aid of a simultaneously introduced nitrogen stream. When the evolution of ethyl bromide upon addition of triethyl phosphite began to decrease, a small additional amount of nickel chloride was added. At the end of the 2–3 hours required to add the triethyl phosphite, the reaction mixture was stirred at 150° C. until no more ethyl bromide was evolved. Distillation of the product mixture afforded 194.5 g. of diethyl phenylphosphonate, B.P. 94–98° C. at 0.2 mm., which represented a yield of 91%. During the course of the reaction, the evolved ethyl bromide was collected in an ice-cooled trap. At the conclusion of the reaction, 103.5 g. of ethyl bromide, 95% of theory, had been collected.

When the procedure was repeated employing 0.005 mole of hydroquinone in the reaction mixture, the yield of diethyl phenylphosphonate was approximately 93% of theoretical.

Example II

By a procedure similar to that of Example I, 15.7 g. of bromobenzene and 2.2 g. of anhydrous nickel bromide were mixed and maintained at 160° C. as 31.6 g. of triisopropyl phosphite were added thereto over a period of 40 minutes as the mixture was stirred. At the end of the period of addition, 10.8 g. of isopropyl bromide, 88% of theory, had been distilled from the reaction mixture and collected in the cold trap. Distillation of the product mixture afforded 20.8 g. of diisopropyl phenylphosphonate, B.P. 96–97° C. at 0.1 mm., which represented an 86% yield.

Example III

By a procedure similar to that of Example II, 34.2 g. of p-bromotoluene and 2.6 g. of anhydrous nickel chloride were mixed and maintained at 160° C. as 50.0 g. of triethyl phosphite was added thereto, dropwise with stirring, over a 1 hour period. The reaction mixture was then heated at 160° C. for an additional 30 minutes at which time 18.6 g., 86% of theory, of ethyl bromide had been collected in the cold trap. Distillation of the product mixture afforded 39.5 g. of diethyl p-tolylphosphonate, B.P. 117–120° C. at 0.01 mm., which represented a yield of 83%.

When the procedure was repeated employing m-bromotoluene, the yield of diethyl m-tolylphosphonate, B.P. 118–121° C. at 0.02 mm., was 86%.

When the procedure was repeated employing o-bromotoluene, the yield of diethyl o-tolylphosphonate, B.P. 117–119° C. at 0.01 mm., was 93%.

Example IV

A series of runs was made wherein various aromatic halides and vinyl halides were reacted with triethyl phosphite in the presence of a nickel halide catalyst according to a procedure similar to that of Example III. The results of this series are shown in Table I wherein the heading "diethyl phosphonate" indicates the character of the diethyl phosphonate product.

TABLE I

| Halide reactant, g. | $NiCl_2$, g. | Triethyl phosphite, g. | Reaction temp., °C. | Reaction time, hrs. | Diethyl phosphonate, percent yield |
|---|---|---|---|---|---|
| p-Bromoanisole, 187 | 6.5 | 199 | 160 | 4.5 | p-Methoxyphenylphosphonate, 72. |
| p-Chlorobromobenzene, 96 | 3.3 | 100 | 160 | 3.5 | p-Chlorophenylphosphonate, 77. |
| Bromododecylbenzene, 97.5 | 0.78 | 55 | 170 | 5.5 | Dodecylphenylphosphonate, 68. |
| p-Bromoacetophenone, 40 | 2.6 | 50.5 | 160 | 2 | p-Acetylphenylphosphonate, 78. |
| p-Acetoxybromobenzene, 21.5 | 1.3 | 25 | 160 | 0.92 | p-Acetoxyphenylphosphonate, 66. |
| p-Carbethoxybromobenzene, 41.2 | 1.5 | 45 | 160 | 2.7 | p-Carbethoxyphenylphosphonate, 72. |
| p-Bromodiethylaniline, 46.5 | 2.6 | 50 | 160 | 1 | p-(Diethylamino)phenylphosphonate, 81. |
| Chlorobenzene, 22.5 | 2.6 | 50 | 180 | 8 | Phenylphosphonate, 74. |
| α-Chloronaphthalene, 81.3 | 6.5 | 88 | 180 | 8 | α-Naphthylphosphonate, 60. |
| 2-bromothiophene, 81.5 | 6.5 | 135 | 150 | 3 | 2-thienylphosphonate, 88. |
| α-Bromostyrene, 18.2 | [1] 4.2 | 24.9 | 150 | 1.5 | α-Styrylphosphonate, 52. |

[1] $NiBr_2$.

Example V

To an autoclave was charged 248 g. of vinyl chloride in 100 ml. of benzene and 100 mg. of hydroquinone. The mixture was heated to 190° C. and 50 ml. of a solution of 7% mole of nickel chloride in 2 moles of triethyl phosphite was added in increments over a 3 hour period. The product mixture was removed from the reactor which was then washed with benzene and the combined product mixture and washings were filtered and distilled. The yield of diethyl vinylphosphonate, B.P. 80–82° C. at 15 mm., was 70.5%

Example VI

A mixture of 55.8 g. of 1,2-dibromoethylene and 3.9 g. of nickel chloride was heated to 100° C. and 149.4 g. of triethyl phosphite was added dropwise. After the reaction mixture had been maintained at 100–160° C. for 6 hours, 81% of the theoretical ethyl bromide had been collected. The product mixture was filtered and distilled to obtain 46 g. of tetraethyl ethylene-1,2-diphosphonate, B.P. 156° C. at 0.8 mm., which represented a yield of 51%.

Example VII

A mixture of 11.8 g. of m-dibromobenzene and 2.1 g. of nickel bromide was maintained at 160° C. for 30 minutes while 25 g. of triethyl phosphite was added thereto. The mixture was maintained at 160° C. for an additional hour and then distilled. The yield of tetraethyl m-phenylenediphosphonate, B.P. 191–194° C. at 0.04 mm., was 73%.

Example VIII

A mixture of 8.9 g. of 5,5-dimethyl-2-ethoxy-1,3,2-dioxaphosphorinane and 3.3 g. of nickel bromide was heated to 160° C. and 7.9 g. of bromobenzene was added dropwise with stirring over a period of 10 minutes. The reaction mixture was maintained at 160° C. for an additional 3 hours at which time 2.2 g., 40% of theory, of bromobenzene had been collected in the cold trap. Distillation of the product mixture afforded 6.1 g. of a colorless oil having a boiling point of 150–160° C. at 0.1 mm. which solidified on standing. Recrystallization from benzene gave 5.2 g. of colorless crystals of 5,5-dimethyl-2-phenyl-2-oxo-1,3,2-dioxaphosphorinane, M.P. 109–111° C.

Example IX

To a mixture of 2.2 g. of nickel bromide and 15.7 g. of bromobenzene, was added 21.8 g. of diethyl benzenephosphonite in a dropwise manner over a 30 minute period while the mixture was stirred and maintained at 160° C. At the conclusion of an additional 1 hour period at 160° C., 8.7 g., 79% of theory, of ethyl bromide had been collected in the cold trap. Distillation of the product mixture yielded 15.9 g. of ethyl diphenylphosphinate, B.P. 148–152° C. at 0.01 mm., which represented a yield of 65%.

Example X

According to the procedure of Example IX, 4.4 g. of nickel bromide, 18.7 g. of p-bromoanisole and 21.8 g. of diethyl benzenephosphonite were contacted and maintained at 160° C. until 10.0 g., 92% of theory, of ethyl bromide was collected. The product mixture was then refluxed for 3 hours with 6 g. of sodium hydroxide in 200 ml. methanol. Subsequent to the removal of methanol by distillation, the resulting mixture was dissolved in water, filtered, extracted with ether, treated with activated charcoal, filtered and acidified to yield colorless crystals of phenyl-p-methoxyphenylphosphinic acid, M.P. 182–184° C. The 22.5 g. of product obtained represented a 91% yield.

Example XI

The procedure of Example X was employed to contact 2.2 g. of nickel bromide, 16.3 g. of 2-bromothiophene and 21.8 g. of diethyl benzenephosphonite. Upon saponification and work-up, the yield of phenyl-thienylphosphonic acid, M.P. 172–174° C. after recrystallization from methanol, was 82%.

Example XII

The procedure of Example X was employed to contact 2.2 g. of nickel bromide, 20.7 g. of α-bromonaphthalene and 21.8 g. of diethyl benzenephosphonite. Upon saponification and work-up, the yield of phenyl-α-naphthylphosphinic acid, M.P. 180–183° C. after recrystallization from methanol, was 94%.

Example XIII

A mixture of 0.19 g. of nickel chloride and 7.9 g. of bromobenzene was contacted, with stirring, for 2.5 hours at 160° C. with 11.5 g. of ethyl diphenylphosphinite. Distillation of the product mixture gave 10 g. of product, B.P. 200–205° C. at 0.1 mm., which was recrystallized from benzene-petroleum ether to afford 7.5 g. of triphenylphosphine oxide, M.P. 155–156° C., which represented a yield of 54%.

Example XIV

A mixing of 1.3 g. of nickel chloride and 32.5 g. of o/p-bromododecylbenzene, wherein the dodecyl group was straight-chain, was reacted with stirring for 0.75 hour at 170° C. with 23 g. of ethyl diphenylphosphinite. The mixture was subsequently heated for 2.25 hours during which time 5.1 g., 47% of theory, of ethyl bromide was collected. Distillation of the product mixture yielded 33.2 g. of diphenyldodecylphenylphosphine oxide, M.P. 68–73° C., which represented a 75% yield.

I claim as my invention:

1. The process of producing organo pentavalent phosphorus compounds by intimately contacting (a) an aromatic or vinyl halide reactant of the formula $$R(X)_m$$ 

wherein X is halogen of atomic number from 17 to 35 inclusive, $m$ is a whole number from 1 to 2 inclusive and R is an organic radical free from non-vinylic aliphatic halide groups of up to 10 carbon atoms selected from (i) a hydrocarbyl aromatic radical bonded to each X by a bond from a carbon atom which is a member of an aromatic ring, (ii) a mono-substituted hydrocarbyl aromatic radical bonded to each X by a bond from a carbon atom which is member of an aromatic ring and the substituent is selected from alkoxy, dialkylamino, alkanoyl, carbalkoxy and acetoxy, and (iii) a hydrocarbyl vinyl radical bonded to each X by a bond from a carbon atom which is a member of a carbon-carbon double bond, and (b) a trivalent phosphorus reactant of at least one alkoxy phosphorus substituent of the formula

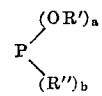

wherein R' is alkyl of up to 7 carbon atoms with the proviso that two R' may together form a divalent radical of from 2 to 7 carbon atoms, R" is R or R', $a$ is a whole number from 1 to 3 inclusive and $b$ is a whole number from 0 to 2 inclusive selected so that $a+b=3$, in the presence of a catalytic amount of nickel halide at a temperature from about 100° C. to about 225° C. in an inert reaction environment, while continuously removing from the resulting mixture alkyl halide thereby produced as formed.

2. The process of claim 1 wherein R is mononuclear aromatic and said nickel halide is nickel chloride or nickel bromide.

3. The process of claim 2 wherein the trivalent phosphorus reactant is trialkyl phosphite.

4. The process of claim 3 wherein the trialkyl phosphite is triethyl phosphite.

5. The process of claim 3 wherein the trialkyl phosphite is triisopropyl phosphite.

6. The process of claim 3 wherein R is phenyl or phenylene.

7. The process of claim 3 wherein R is acetoxyphenyl.

8. The process of claim 2 wherein the trivalent phosphorus reactant is a dialkyl phosphonite.

9. The process of claim 8 wherein the dialkyl phosphonite is diethyl benzenephosphonite.

10. The process of claim 1 wherein R is a hydrocarbyl vinyl radical bonded to each X by a bond from a carbon atom which is a member of a carbon-carbon double bond and said nickel halide is nickel chloride or nickel bromide.

11. The process of claim 10 wherein the trivalent phosphorus reactant is trialkyl phosphite.

12. The process of claim 11 wherein R is α-styryl.

13. The process of claim 11 wherein R is vinyl.

14. The process of claim 11 wherein the vinyl halide reactant is 1,2-dibromoethylene.

15. The process of claim 11 wherein the trialkyl phosphite is triethyl phosphite.

References Cited

UNITED STATES PATENTS

| 2,389,576 | 11/1945 | Kosolapoff | 260—969 |
| 3,175,998 | 3/1965 | Rabinowitz | 260—969 X |
| 3,177,208 | 4/1965 | Stilz et al. | 260—969 X |

CHARLES B. PARKER, Primary Examiner

R. L. RAYMOND, Assistant Examiner

U.S. Cl. X.R.

260—293, 329, 502.4, 606.5, 937, 941, 945, 946, 951, 952, 957